US006952675B1

(12) United States Patent
Tahara et al.

(10) Patent No.: US 6,952,675 B1
(45) Date of Patent: Oct. 4, 2005

(54) METHODS AND APPARATUS FOR VOICE INFORMATION REGISTRATION AND RECOGNIZED SENTENCE SPECIFICATION IN ACCORDANCE WITH SPEECH RECOGNITION

(75) Inventors: Yoshinori Tahara, Kanagawa (JP); Daisuke Tomoda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/656,963

(22) Filed: Sep. 7, 2000

(30) Foreign Application Priority Data

Sep. 10, 1999 (JP) .................................. 11-257587

(51) Int. Cl.⁷ ............................................ G10L 15/28
(52) U.S. Cl. ..................................................... 704/255
(58) Field of Search ................................. 704/255, 251

(56) References Cited

U.S. PATENT DOCUMENTS

| 4,507,750 | A | * | 3/1985 | Frantz et al. ............... 704/231 |
| 4,749,353 | A | * | 6/1988 | Breedlove .................. 704/270 |
| 4,914,704 | A | * | 4/1990 | Cole et al. .................. 704/235 |
| 5,208,897 | A | * | 5/1993 | Hutchins .................... 704/231 |
| 6,018,736 | A | * | 1/2000 | Gilai et al. .................... 707/6 |
| 6,208,964 | B1 | * | 3/2001 | Sabourin .................... 704/244 |
| 6,233,553 | B1 | * | 5/2001 | Contolini et al. ........... 704/220 |
| 2003/0229497 | A1 | * | 12/2003 | Wilson et al. ........... 704/270.1 |

FOREIGN PATENT DOCUMENTS

| JP | 06-012092 | 1/1994 |
| JP | 10-320168 | 12/1998 |
| JP | 11-231886 | 8/1999 |
| JP | 2001-022374 | 1/2001 |

OTHER PUBLICATIONS

IBM TDB, "Using Aletrnate Spellings to Generate Baseforms",Jun. 1, 1992, IBM Technical Disclosure Bulletin, vol. 35, Iss. 1A, pp 59.*
K. Takagi et al., "Language Modeling and Topic Extraction for Broadcast News," The Institute of Electronics, Information and Communication Engineers, pp. 73-80, Jun. 1998.

* cited by examiner

*Primary Examiner*—Vijay Chawan
*Assistant Examiner*—Michael N. Opsasnick
(74) *Attorney, Agent, or Firm*—Anne V. Dougherty; Ryan, Mason & Lewis, LLP

(57) ABSTRACT

A group of sentences to be recognized is obtained from an application and, using parsing logic, each target sentence to be recognized is divided into words, e.g., speech recognition units. Thereafter, the words in each target sentence are examined to determine whether among them there are unknown words that are not registered in the speech recognition dictionary, but for which the sounds-like spelling is available. If an unknown word is found, a base form, for which the pronunciation is inferred from the sounds-like spelling, is prepared and is registered in the speech recognition dictionary. This base form is employed when the voice of a user, who has orally designated one of the sentences, is recognized.

15 Claims, 10 Drawing Sheets

| WORD INSCRIPTION | | |
|---|---|---|
| Tahara | | |
| SOUNDS-LIKE SPELLING | PRONUNCIATION INSCRIPTION | SOUNDS-LIKE SPELLING SCORE |
| Tahara | tahara | 0.83 |
| Tawara | tawara | 0.56 |
| Tabara | tabara | 0.45 |
| Tabaru | tabaru | 0.20 |
| Dahara | dahara | 0.02 |

- 301 WORD INSCRIPTION
- 303 SOUNDS-LIKE SPELLING
- 305 PRONUNCIATION INSCRIPTION
- 307 SOUNDS-LIKE SPELLING SCORE

FIG. 4
310

| PRONUNCIATION INSCRIPTION | |
|---|---|
| Koushi | |
| BASE FORM | PRONUNCIATION SCORE |
| BASE FORM 1 | 0.74 |
| BASE FORM 2 | 0.58 |
| BASE FORM 3 | 0.37 |

- 311 PRONUNCIATION INSCRIPTION
- 313 BASE FORM
- 315 PRONUNCIATION SCORE

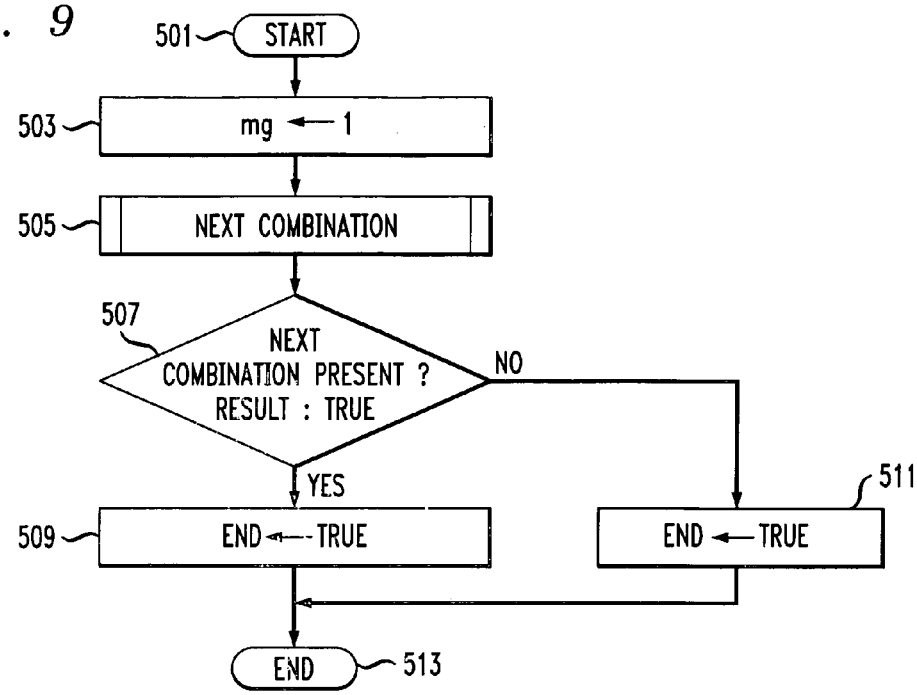
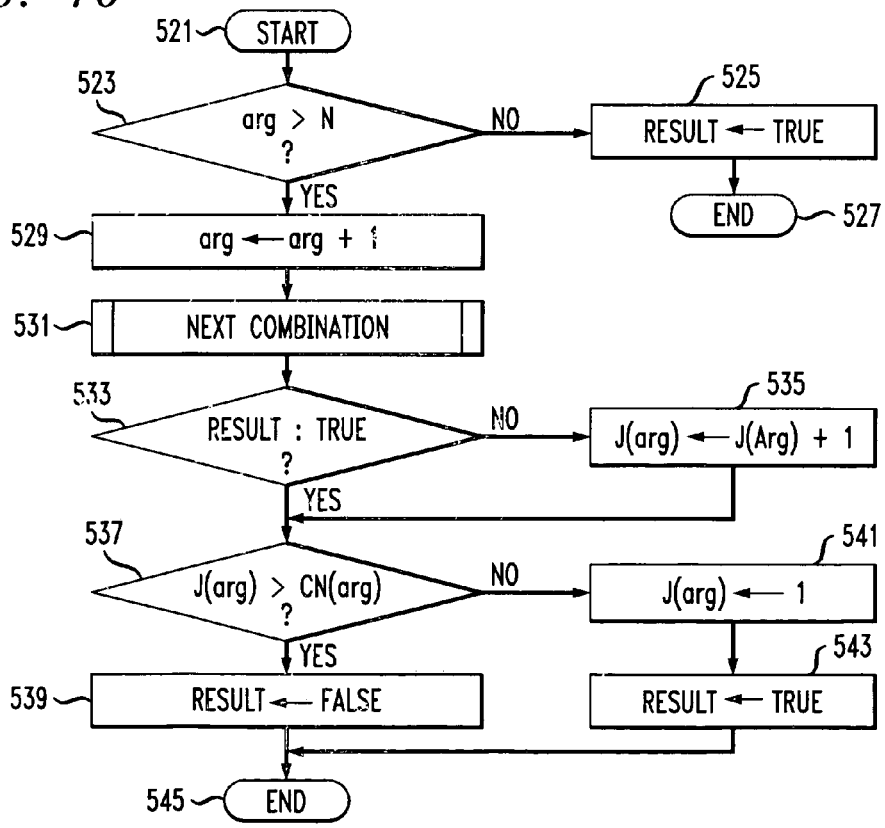

*FIG. 12*

EXAMPLE 1 「横浜／市営／地下鉄／が／戸塚／から／湘南台／まで／延長」 — 600
601 602 603 604 605 606 607 608 609

EXAMPLE 2 「IBM／の／e－ビジネス／が／順調／だ」 — 610
611 612 613 614 615 616

EXAMPLE 3 「Pervasive／Computing／Development」 — 620
621 622 623

EXAMPLE 4 「私／の／名前／は／田原／です」 — 630
631 632 633 634 635 636

EXAMPLE 5 「401 (k) ／mutual／fund／strategy」 — 640
641 642 643 644

METHODS AND APPARATUS FOR VOICE INFORMATION REGISTRATION AND RECOGNIZED SENTENCE SPECIFICATION IN ACCORDANCE WITH SPEECH RECOGNITION

FIELD OF THE INVENTION

The present invention relates to speech recognition, and relates more specifically to a method whereby voice is used to specify information displayed on a screen.

BACKGROUND OF THE INVENTION

As is described in Japanese Unexamined Patent Publication No. Hei 10-320168, the disclosure of which is incorporated by reference herein, a conventional method is available whereby voice is used to specify information displayed on a screen. However, to use this method, a menu or a button in an application, and a sentence in which a link to a web is included must be registered using words that can be recognized by a speech recognition system.

All of the character strings for a menu, in this case, can be statically added to a speech recognition dictionary, but since the web link would tend to be changed daily, coping with such a change would exceed the capabilities of a method for which static registration is employed. In addition, if too many words, more than are necessary, are added to the dictionary, other problems, such as a reduction in the recognition accuracy or an extended processing time, may be encountered.

SUMMARY OF THE INVENTION

It is one object of the present invention to provide a speech recognition system whereby voice can be employed for the recognition of all sentences, even those including words that have not been registered in a speech recognition dictionary.

It is another object of the present invention to provide a speech recognition system that maintains predetermined standards for recognition accuracy and processing speed, and that requires only a small amount of resources.

It is an additional object of the present invention to provide a speech recognition system that is easy to use and that enables a user to intuitively understand an obtained result.

A group of sentences to be recognized is obtained from an application, and using parsing logic, each target sentence to be recognized is divided into words, speech recognition units. Thereafter, the words in each target sentence are examined to determine whether among them there are unknown words that are not registered in the speech recognition dictionary, but for which the sounds-like spelling is available. If an unknown word is found, a base form, for which the pronunciation is inferred from the sounds-like spelling, is prepared and is registered in the speech recognition dictionary. This base form is employed when the voice of a user is recognized who has orally designated one of the sentences.

According to one aspect of the present invention, provided is a voice information registration method, employed by a speech recognition apparatus, for which a voice input device is used, comprises:

(a) obtaining a sentence group, which includes the first to the N-th (N is a natural number equal to or greater than 2) sentence;

(b) obtaining the sounds-like spelling for a word that is included in the i-th (i is a natural number equal to or smaller than N) sentence, but is not entered in a speech recognition dictionary;

(c) obtaining a base form based on the sounds-like spelling of the word; and (d) registering the base form in a speech recognition dictionary in correlation with the word.

According to one more aspect of the present invention, provided is a sentence specification method, employed by a speech recognition apparatus, for which a voice input device is used, comprises:

a registration step including:

(a1) obtaining a sentence group, which includes the first to the N-th (N is a natural number equal to or greater than 2) sentence, (a2) obtaining the sounds-like spelling for a word that is included in the i-th (i is a natural number equal to or smaller than N) sentence, but is not entered in a speech recognition dictionary, (a3) obtaining a base form based on the sounds-like spelling of the word, and (a4) registering the base form in a speech recognition dictionary in correlation with the word; and a recognition step including:

(b1) obtaining voice information that is input as a user reads and vocally reproduces a display corresponding to the i-th sentence, (b2) employing the base form to recognize the voice information and to select a speech recognition sentence, and (b3) comparing the i-th sentence with the selected speech recognition sentence.

According to another aspect of the present invention, the group of target sentences is obtained from an application, and provided is the sentence specification method further comprises a step of generating a control message corresponding to the i-th sentence and transmitting the control message to the application.

According to an additional aspect of the present invention, provided is the sentence specification method in which a sounds-like spelling score is stored in correlation with the sounds-like spelling of the word, in which a pronunciation score is stored in correlation with the base form, and in which, when a function value that is obtained by using the sounds-like spelling score and the pronunciation score exceeds a threshold value, the base form is registered in a speech recognition dictionary.

According to one further aspect of the present invention, provided is a sentence specification method, employed by a speech recognition apparatus, for which a voice input device is used, comprises:

a registration step including:

(a1) obtaining a sentence group, which includes the first to the N-th (N is a natural number equal to or greater than 2) sentence, (a2) obtaining the sounds-like spelling for a word that is included in the i-th (i is a natural number equal to or smaller than N) sentence, but is not entered in a speech recognition dictionary, (a3) obtaining a base form based on the sounds-like spelling of the word, (a4) calculating a score for the base form, and (a5) registering the base form, when the score for the base form exceeds a threshold value, in the speech recognition dictionary in correlation with the word; and a recognition step including:

(b1) obtaining voice information that is input as a user reads and vocally reproduces a display corresponding to the i-th sentence, (b2) employing the base form to recognize the voice information and to select a speech recognition sentence, (b3) comparing the i-th sentence with the selected speech recognition sentence, (b4) performing a process associated with a sentence for which a match is obtained when it is found that the i-th sentence and the selected speech recognition sentence match, (b5) updating the threshold value to provide a smaller second threshold value when only part of the selected speech recognition sentence is matched by the i-th sentence, (b6) detecting an unknown word that is included in the i-th sentence, (b7) obtaining the sounds-like spelling of the unknown word, (b8) obtaining a second base form based on the sounds-like spelling for the unknown word, (b9) calculating the score for the second base form, and (b10) registering the score in the speech recognition dictionary, in correlation with the unknown word, when the score for the second base form exceeds the second threshold value.

According to yet one more aspect of the present invention, provided is a speech recognition apparatus, for which a voice input device is used, comprises:

(a) a sentence specification unit for obtaining a sentence group, which includes the first to the N-th (N is a natural number equal to or greater than 2) sentence;

(b) an unknown word detector for obtaining the sounds-like spelling for a word that is included in the i-th (i is a natural number equal to or smaller than N) sentence, but is not entered in a speech recognition dictionary;

(c) a base form generator for obtaining a base form based on the sounds-like spelling of the word; and (d) a speech recognition dictionary to which the base form is stored in correlation with the word.

According to yet another aspect of the present invention, provided is a speech recognition apparatus, for which a voice input device is used, comprises:

(a) a sentence specification unit for obtaining a sentence group, which includes the first to the N-th (N is a natural number equal to or greater than 2) sentence;

(b) an unknown word detector for obtaining the sounds-like spelling for a word that is included in the i-th (i is a natural number equal to or smaller than N) sentence, but is not entered in a speech recognition dictionary;

(c) a base form generator for obtaining a base form based on the sounds-like spelling of the word;

(d) a speech recognition dictionary in which the base form is stored in correlation with the word;

(e) a voice input unit for obtaining voice information that is input as a user reads and vocally reproduces a display corresponding to the i-th sentence; and (f) a speech recognition engine for employing the base form to recognize the voice information and to select a speech recognition sentence, wherein (a2) the sentence specification unit compares the i-th sentence with the selected speech recognition sentence.

According to yet an additional aspect of the present invention, provided is the speech recognition apparatus in which the sentence specification unit obtains the group of target sentences from an application, generates a control message corresponding to the i-th sentence, and transmits the control message to the application.

According to yet one further aspect of the present invention, provided is the speech recognition apparatus in which a sounds-like spelling score is stored in correlation with the sounds-like spelling of the word, in which a pronunciation score is stored in correlation with the base form, and in which, when a function value that is obtained by using the sounds-like spelling score and the pronunciation score exceeds a threshold value, the base form is registered in a speech recognition dictionary.

According to still one more aspect of the present invention, provided is a speech recognition apparatus, for which a voice input device is used, comprises:

(a) a sentence specification unit for obtaining a sentence group, which includes the first to the N-th (N is a natural number equal to or greater than 2) sentence;

(b) an unknown word detector for obtaining the sounds-like spelling for a word that is included in the i-th (i is a natural number equal to or smaller than N) sentence, but is not entered in a speech recognition dictionary;

(c) a base form generator for obtaining a base form based on the sounds-like spelling of the word, and for calculating a score for the base form;

(d) a speech recognition dictionary in which, when the score for the base form exceeds a threshold value, the base form is registered in the speech recognition dictionary in correlation with the word;

(e) a voice input unit for obtaining voice information that is input as a user reads and vocally reproduces a display corresponding to the i-th sentence;

(f) a speech recognition engine for employing the base form to recognize the voice information and to select a speech recognition sentence, wherein (a2) the sentence specification unit compares the i-th sentence with the selected speech recognition sentence; performs a process associated with a sentence for which a match is obtained when it is found that the i-th sentence and the selected speech recognition sentence match; updates the threshold value to provide a smaller second threshold value when only part of the selected speech recognition sentence is matched by the i-th sentence; instructs the unknown word detector to detect an unknown word that is included in the i-th sentence and to obtain the sounds-like spelling of the unknown word; instructs the base form generator to obtain a second base form based on the sounds-like spelling for the unknown word and to calculate the score for the second base form; and registers the score in the speech recognition dictionary, in correlation with the unknown word, when the score for the second base form exceeds the second threshold value.

According to still another aspect of the present invention, provided is a storage medium in which a program for specifying a sentence is stored to be executed by a speech recognition apparatus, for which a voice input device is used, the program comprising:

(a) program code for instructing the speech recognition apparatus to obtain a sentence group, which includes the first to the N-th (N is a natural number equal to or greater than 2) sentence;
(b) program code for instructing the speech recognition apparatus to obtain the sounds-like spelling for a word that is included in the i-th (i is a natural number equal to or smaller than N) sentence, but is not entered in a speech recognition dictionary;
(c) program code for instructing the speech recognition apparatus to obtain a base form based on the sounds-like spelling of the word; and
(d) program code for instructing the speech recognition apparatus to register the base form in a speech recognition dictionary in correlation with the word.

According to still an additional aspect of the present invention, provided is a storage medium in which a program for specifying a sentence is stored to be executed by a speech recognition apparatus, for which a voice input device is used, the program comprising:

(a) program code for instructing the speech recognition apparatus to obtain a sentence group, which includes the first to the N-th (N is a natural number equal to or greater than 2) sentence;
(b) program code for instructing the speech recognition apparatus to obtain the sounds-like spelling for a word that is included in the i-th (i is a natural number equal to or smaller than N) sentence, but is not entered in a speech recognition dictionary;
(c) program code for instructing the speech recognition apparatus to obtain a base form based on the sounds-like spelling of the word;
(d) program code for instructing the speech recognition apparatus to register the base form in a speech recognition dictionary in correlation with the word;
(e) program code for instructing the speech recognition apparatus to obtain voice information that is input as a user reads and vocally reproduces a display corresponding to the i-th sentence;
(f) program code for instructing the speech recognition apparatus to employ the base form to recognize the voice information and to select a speech recognition sentence; and
(g) program code for instructing the speech recognition apparatus to compare the i-th sentence with the selected speech recognition sentence.

According to still one further aspect of the present invention, the group of target sentences is obtained from an application, and provided is the storage medium in which program code is stored to instruct the speech recognition apparatus to generate a control message corresponding to the i-th sentence and to transmit the control message to the application.

According to again one more aspect of the present invention, provided is the storage medium in which a sounds-like spelling score is stored in correlation with the sounds-like spelling of the word; in which a pronunciation score is stored in correlation with the base form, and in which, when a function value that is obtained by using the sounds-like spelling score and the pronunciation score exceeds a threshold value, the base form is registered in a speech recognition dictionary.

According to again another aspect of the present invention, provided is a storage medium in which a program for specifying a sentence is stored to be executed by a speech recognition apparatus, for which a voice input device is used, the program comprising:

(a) program code for instructing the speech recognition apparatus to obtain a sentence group, which includes the first to the N-th (N is a natural number equal to or greater than 2) sentence;
(b) program code for instructing the speech recognition apparatus to obtain the sounds-like spelling for a word that is included in the i-th (i is a natural number equal to or smaller than N) sentence, but is not entered in a speech recognition dictionary;
(c) program code for instructing the speech recognition apparatus to obtain a base form based on the sounds-like spelling of the word;
(d) program code for instructing the speech recognition apparatus to calculate a score for the base form;
(e) program code for instructing the speech recognition apparatus to register the base form, when the score for the base form exceeds a threshold value, in the speech recognition dictionary in correlation with the word;
(f) program code for instructing the speech recognition apparatus to obtain voice information that is input as a user reads and vocally reproduces a display corresponding to the i-th sentence;
(g) program code for instructing the speech recognition apparatus to employ the base form to recognize the voice information and to select a speech recognition sentence;
(h) program code for instructing the speech recognition apparatus to compare the i-th sentence with the selected speech recognition sentence;
(i) program code for instructing the speech recognition apparatus to perform a process associated with a sentence for which a match is obtained when it is found that the i-th sentence and the selected speech recognition sentence match;
(j) program code for instructing the speech recognition apparatus to update the threshold value to provide a smaller second threshold value when only part of the selected speech recognition sentence is matched by the i-th sentence;
(k) program code for instructing the speech recognition apparatus to detect an unknown word that is included in the i-th sentence;
(l) program code for instructing the speech recognition apparatus to obtain the sounds-like spelling of the unknown word;
(m) program code for instructing the speech recognition apparatus to obtain a second base form based on the sounds-like spelling for the unknown word;
(n) program code for instructing the speech recognition apparatus to calculate the score for the second base form; and
(o) program code for instructing the speech recognition apparatus to registering the score in the speech recognition dictionary, in correlation with the unknown word, when the score for the second base form exceeds the second threshold value.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a conceptual diagram showing an unknown word detection dictionary according to an embodiment of the present invention.

FIG. 4 is a conceptual diagram showing a pronunciation dictionary according to an embodiment of the present invention.

FIG. 9 is a flowchart showing the processing performed according to an embodiment of the present invention to acquire a combination of a pronunciation and a sentence to be recognized.

FIG. 10 is a flowchart showing the processing performed according to an embodiment of the present invention of acquire a combination of a pronunciation and a sentence to be recognized.

FIG. 12 is a diagram showing examples associated with the present invention.

DETAILED DESCRIPTION OF PREFERRED EMBODIMENTS

A. Hardware Arrangement

Figure 1:
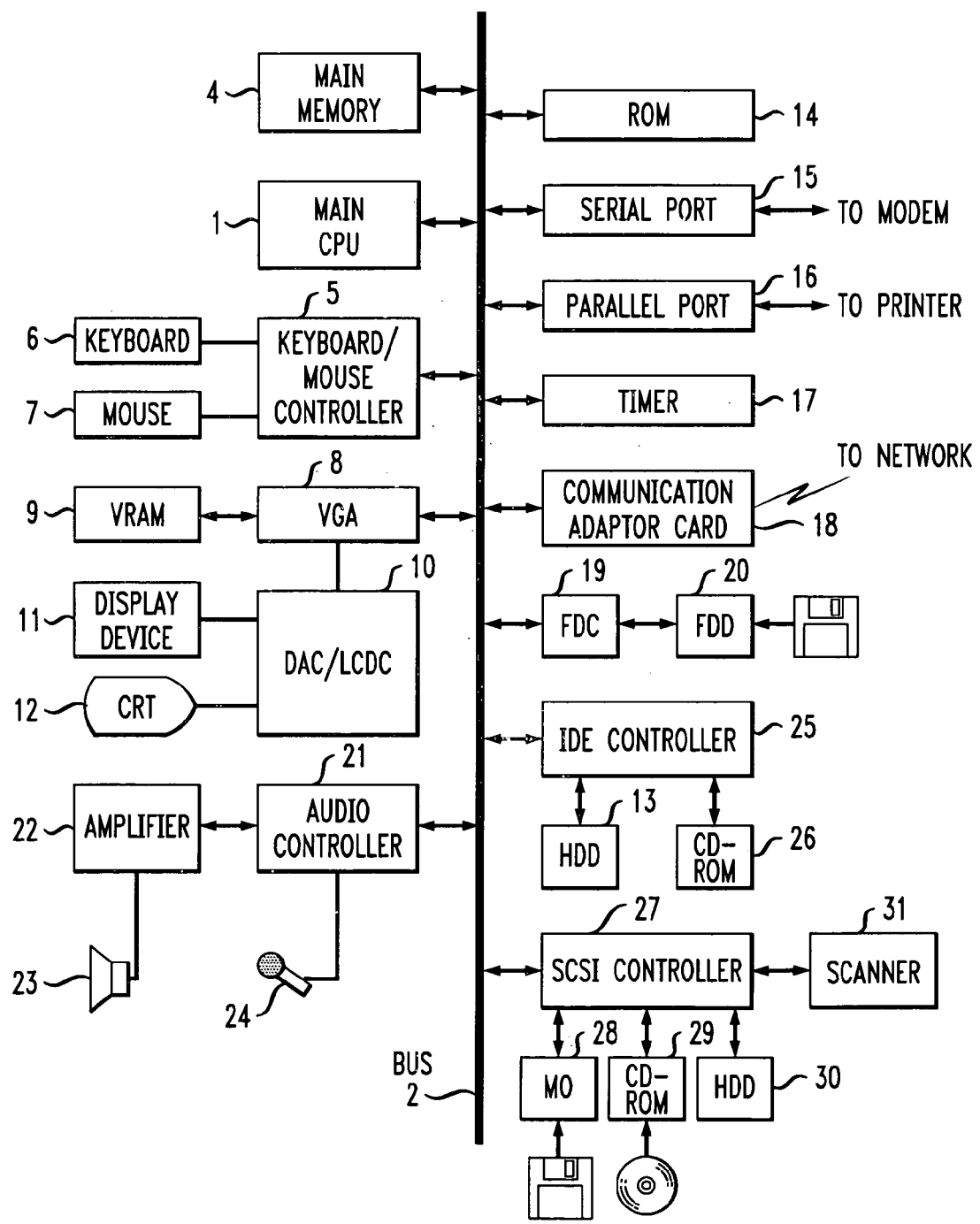
FIG. 1 is a block diagram showing one example hardware arrangement for a speech recognition apparatus according to the present invention.

FIG. 1 is a diagram showing a hardware arrangement for a speech recognition system 100 according to the present invention. The speech recognition system 100 comprises a central processing apparatus (CPU) 1 and a memory 4. The CPU 1 and the memory 4 are connected by a bus 2 to hard disk drives 13 and 30, which are auxiliary storage devices. A floppy disk drive 20 (or a storage medium drive 26, 28, 29 or 30, such as an MO 28 or a CD-ROM 26 or 29) is connected to the bus 2 via a floppy disk controller 19 (or an IDE controller 25 or a SCSI controller 27).

A floppy disk (or another storage medium, such as an MO or a CD disk) is inserted into the floppy disk drive 20 (or into the storage medium driver 26, 28, 29 or 30, such as an MO or a CD-ROM), and code or data is read for a computer program, which interacts with an operating system and which issues instructions to the CPU 1 for carrying out the present invention, that is stored on the floppy disk, or on the hard disk drive 13 or in a ROM 14. The code for this computer program, which is executed by loading it into the memory 4, can either be compressed or can be divided into multiple segments for storage on multiple storage mediums.

The speech recognition system 100 further comprises user interface hardware components. These user interface hardware components include a pointing device (a mouse, a joystick or a track ball) 7, for entering on-screen positioning information; a keyboard 6, for keying in data; and display devices 11 and 12, for providing visual data for a user. A loudspeaker 23 is used to receive audio signals from an audio controller 21 via an amplifier 22, and to output the signals as sound. A voice input device or microphone 24 is also provided for inputting speech.

The speech recognition system 100 of the present invention can communicate with another computer via a serial port 15 and a modem, or via a communication adaptor 18, such as one for a token ring.

The present invention can be carried out by a common personal computer (PC); by a workstation; by a computer incorporated in a television set, a facsimile machine or another electrical home appliance; by a computer (car navigation system, etc.) mounted in a vehicle or an airplane; or by a combination of the components described above. It should be noted, however, that these components are merely examples, and that not all of them are required for the present invention. In particular, since the present invention relates to the vocal specification of character information, components such as the serial port 15 and the parallel port 16 are not necessarily required.

A preferable operating system for the speech recognition system 100 is one that supports a GUI multi-window environment, such as WindowsNT, Windows9x or Windows3.x (trademarks of Microsoft), OS/2 (a trademark of IBM), MacOS (a trademark of Apple Corp.), Linux (a trademark of Linus Torvalds), or the X-WINDOW system (a trademark of MIT) on AIX (a trademark of IBM); one that runs in a character-based environment, such as PC-DOS (a trademark of IBM) or MS-DOS (a trademark of Microsoft); a real-time OS, such as OS/Open (a trademark of IBM) or VxWorks (a trademark of Wind River Systems, Inc.); or an OS that is incorporated in a network computer, such as JavaOS. However, the operating system for the present invention is not specifically limited.

B. System Configuration

Figure 2:
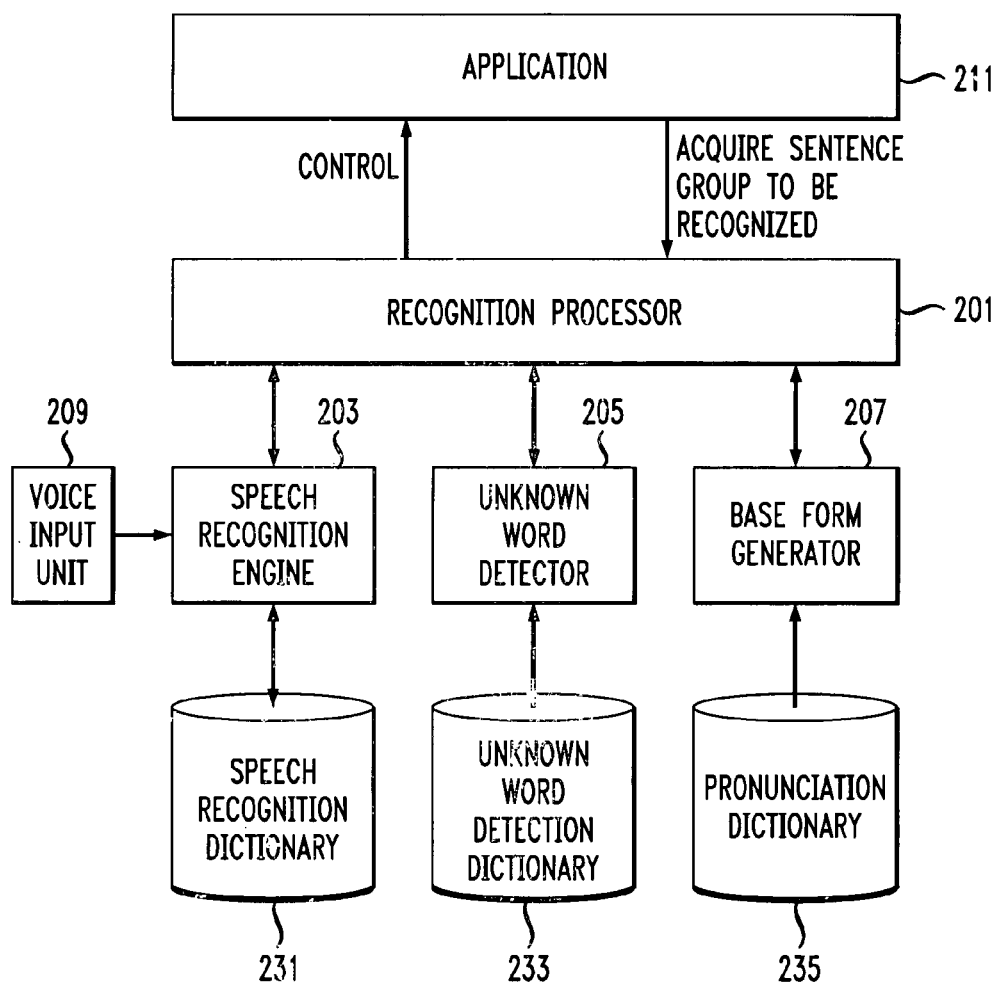
FIG. 2 is a block diagram showing the components of a speech recognition system according to a preferred embodiment of the present invention.

FIG. 2 is a functional block diagram illustrating the components of a speech recognition system according to a preferred embodiment of the present invention.

The speech recognition system in a preferred embodiment of the present invention comprises a recognized character specification unit 201, a speech recognition engine 203, an unknown word detector 205, a base form generator 207, a voice input unit 209, an application 211, a speech recognition dictionary 231, an unknown word detection dictionary 233, and a pronunciation dictionary 235.

The recognized character specification unit 201 enters a group of sentences obtained from the application 211, and selects one of the sentences in the group based on a speech recognition sentence that is received from the speech recognition engine 203. In addition, the recognized character specification unit 201 controls certain components, such as the unknown word detector 205.

The speech recognition engine 203 employs the speech recognition dictionary 231 to analyze voice information that is actually input and to output a speech recognition sentence.

The unknown word detector 205 receives data for the target sentence from the recognized character specification unit 201, employs the unknown word detection dictionary 233 to detect an unknown word, and outputs the sounds-like spelling and the score for the unknown word. In addition, based on a predetermined logic, the unknown word detector 205 corrects the sounds-like spelling score.

In a case where the inscription of a word consists of only kana characters, and the sound of the word is not prolonged, the score is corrected to 1. In a case wherein the accuracy attained by a speech recognition dictionary is not high and a word that matches the inscription is recorded in the dictionary (for example, if a dictionary for kana/kanji conversion is employed), the sounds-like spelling score is corrected and a lower value is awarded if the sound of the word can be prolonged. The sounds-like spelling score can be designated in accordance with statistical information, such as the probability of an occurrence, and an empirical value.

FIG. 3 is a conceptual diagram showing the unknown word detection dictionary 233 for an embodiment of the present invention. As is shown in FIG. 3, word inscriptions 301, sounds-like spellings 303, pronunciation inscriptions 305, and sounds-like spelling scores 307 are managed in the unknown word detection dictionary 233.

The base form generator 207 uses an unknown word inscription and sounds-like spelling information that are input to conduct a search of the pronunciation dictionary 235, and outputs a corresponding base form and a pronunciation score. In addition, a predetermined logic is employed by the base form generator 207 to correct a pronunciation score. The pronunciation score can be set based on statistical information, such as the probability of an occurrence, and an empirical value. And based on the sounds-like spelling score and the pronunciation score, a function value, obtained, for example, by multiplying the sounds-like spelling score by the pronunciation score, can be set as the score for a base form corresponding to the unknown word.

FIG. 4 is a conceptual diagram showing the pronunciation dictionary 235 according to an embodiment of the present invention. As is shown in FIG. 4, a pronunciation inscription 311, a base form 313 and a pronunciation score 315 are managed in the pronunciation dictionary 235.

The voice input unit 209 fetches voice information from the user into the system.

The application 211 is a web browser used for this embodiment. However, the application 211 can also be software, such as a word processor or a presentation application, that processes character information, or software that processes image information that can be converted into character information.

The functional blocks in FIG. 2 have been explained. These functional blocks are logical blocks. This does not mean that they must each be implemented by a hardware unit or a software unit; rather, they can be implemented by employing a combination composed of common hardware and software.

C. Operating procedures

In a preferred embodiment of the present invention, generally, the following four operating procedures are employed when sentences for which recognition processing is to be performed are specified.
1. Acquisition of a group of target sentences to be recognized (C-1).
2. Detection of unknown words (C-2).
3. Registration of unknown words in a speech recognition dictionary (C-3).
4. Dynamic changing of a threshold value at the time an erroneous recognition is detected (C-4).

C-1. Acquisition of a Group of Target Sentences

The pronunciation score can be set based on statistical information, such as the probability of an occurrence, and an empirical value. And based on the sounds-like spelling score and the pronunciation score, a function value, obtained, for example, by multiplying the sounds-like spelling score by the pronunciation score, can be set as the score for a base form corresponding to an unknown word. An explanation will now be given for the processing employed to obtain a group of target sentences when a web browser is employed as the application 211.

First, the use of a method that employs MSAA (Microsoft Active Accessibility) ("MSAA (Microsoft Active Accessibility)" is a trademark of Microsoft Corp.) will be considered. MSAA can be employed for a program version in a Windows environment. When an API (application programming interface) defined using MSAA is employed, the information for controlling the page displayed on a browser can be obtained in real time. The information indicating the existence of links can be extracted from the control information and defined as a group of target sentences.

Second, the use of a method for directly reading an HTML (HyperText Markup Language) document will be considered. According to this method, a source corresponding to a page displayed on a browser is obtained. HTML tags for the source are analyzed, and sentences at tags indicating the existence of links can be extracted and defined as a group of target sentences.

Third, the use of a method for employing an API provided by a browser will be considered. A browser, such as the Internet Explorer ("Internet Explorer" is a trademark of Microsoft Corp.) or the Netscape Navigator ("Netscape Navigator" is a trademark of Netscape Communications), provides a unique API for extracting information from a displayed page. The state of the page and link information can be obtained by using the API.

The above methods are merely examples, and the idea on which the present invention is based is not thereby limited. Various methods have been proposed for extracting sentences from target applications, and the alternation of the extraction method before executing the present invention should present no problems for one having ordinary skill in the art.

C-2. Detection of Unknown Word

Unknown words are detected in extracted sentences. In this instance, an unknown word is one that is recognized as being a word but that is not registered in the speech recognition dictionary 231, and that has a base form that is unknown to the system.

Figure 5:
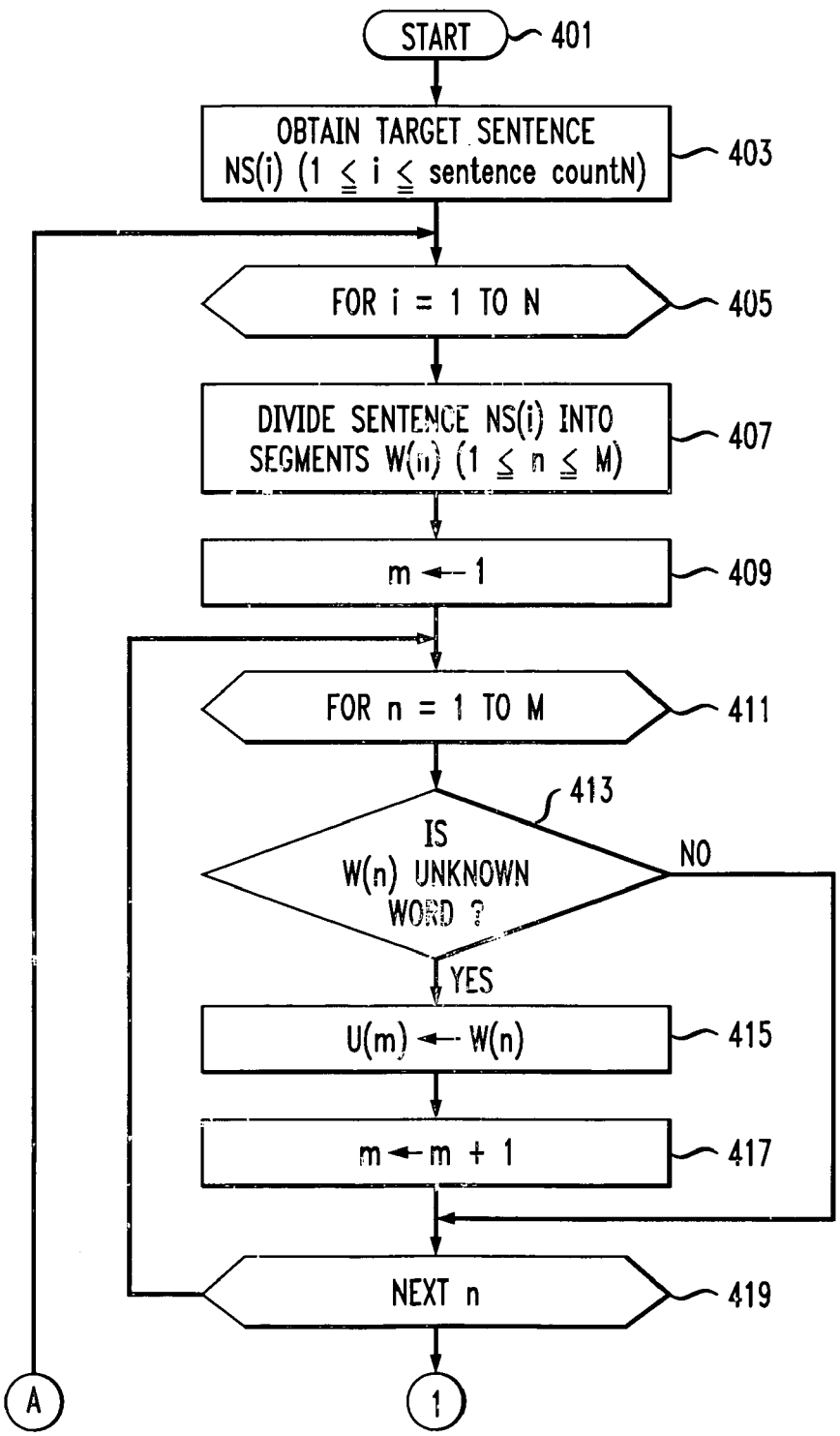
FIG. 5 is a flowchart showing the unknown word detection processing performed according to an embodiment of the present invention.

FIG. 5 is a flowchart showing the unknown word detection processing. First, the unknown word detector 205 obtains the first target sentence from a group of sentences N (step 403), a process that is repeated for all the sentences (step 405). Thereafter, the current target sentence is divided into a plurality of words that constitute speech recognition units (step 407).

When a space is inserted between words, in English, for example, it is comparatively easy to divide a sentence into words by using the information provided by the space. However, in languages such as Japanese, for which Chinese characters are used, generally no space is provided between words. Therefore, the parsing method (segmentation or word division) is employed for complicated word division and unknown word detection. Since at the time of the submission of the present application, however, various parsing logics, which are appropriate for sentence navigation, had already been proposed, and since parsing logic is well known to one having the ordinary skill in the art, no detailed explanation will be given for the parsing method that is used.

To continue, each of the parsed words is examined, and a word that is determined to be unknown (is entered in the unknown word detection dictionary 233) is registered in the unknown array U (steps 409 to 419). In this embodiment, a set consisting of the sounds-like spelling, a pronunciation inscription and a sounds-like spelling score, which is explained while referring to FIG. 3, is registered for one unknown word.

Examples of target sentences that have has been parsed are shown in FIG. 12. In the sentences, "/" is a delimiter, and an unknown word is underlined.

The sentence 600 means:

"Yokohama Municipal Subway is extended from Totsuka to Shonandai." The word 601 is "Yokohama," 602 is "Municipal," 603 is "Subway," 604 is "is," 605 is "Totsuka," 606 is "from," 607 is "honandai," 608 is "to" and 609 is "extended."

The sentence 610 means:

"The e-business of IBM is satisfactory."

The word 611 is "IBM," 612 is "of," 613 is "e-business," 614 is "is," 615 and 616 are "satisfactory."

The sentence 630 means:

"My name is Tahara."

The word 631 means "I" and 632 means the possessive case.

The word 633 is "name," 634 is "is," 635 is "Tahara" and 636 is a redundant word for the politeness.

Figure 6:
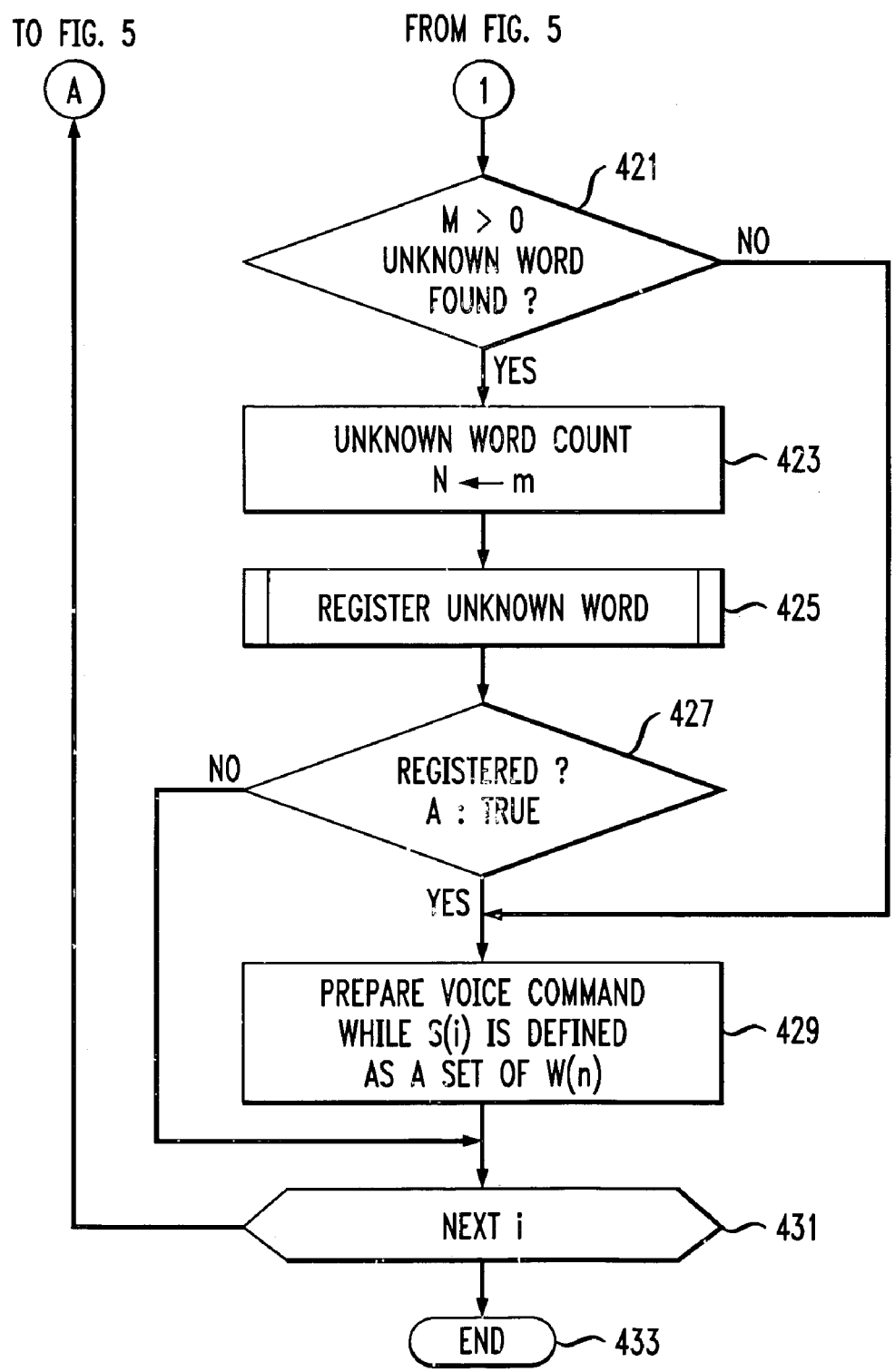
FIG. 6 is a flowchart showing the processing performed according to an embodiment of the present invention to obtain a base form corresponding to an unknown word and to register the base form in a speech recognition dictionary.

C-3. Acquisition of Base Form Corresponding to Unknown Word, and Registration of Pertinent Base Form in Speech Recognition Dictionary An explanation will now be given for the processing performed to acquire a base form corresponding to an unknown word, and the processing performed to register the base form in a speech recognition dictionary. FIG. 6 is a flowchart for explaining this processing. First, when an unknown word is detected (step 421), it is registered (steps 423 to 429).

Figure 7:
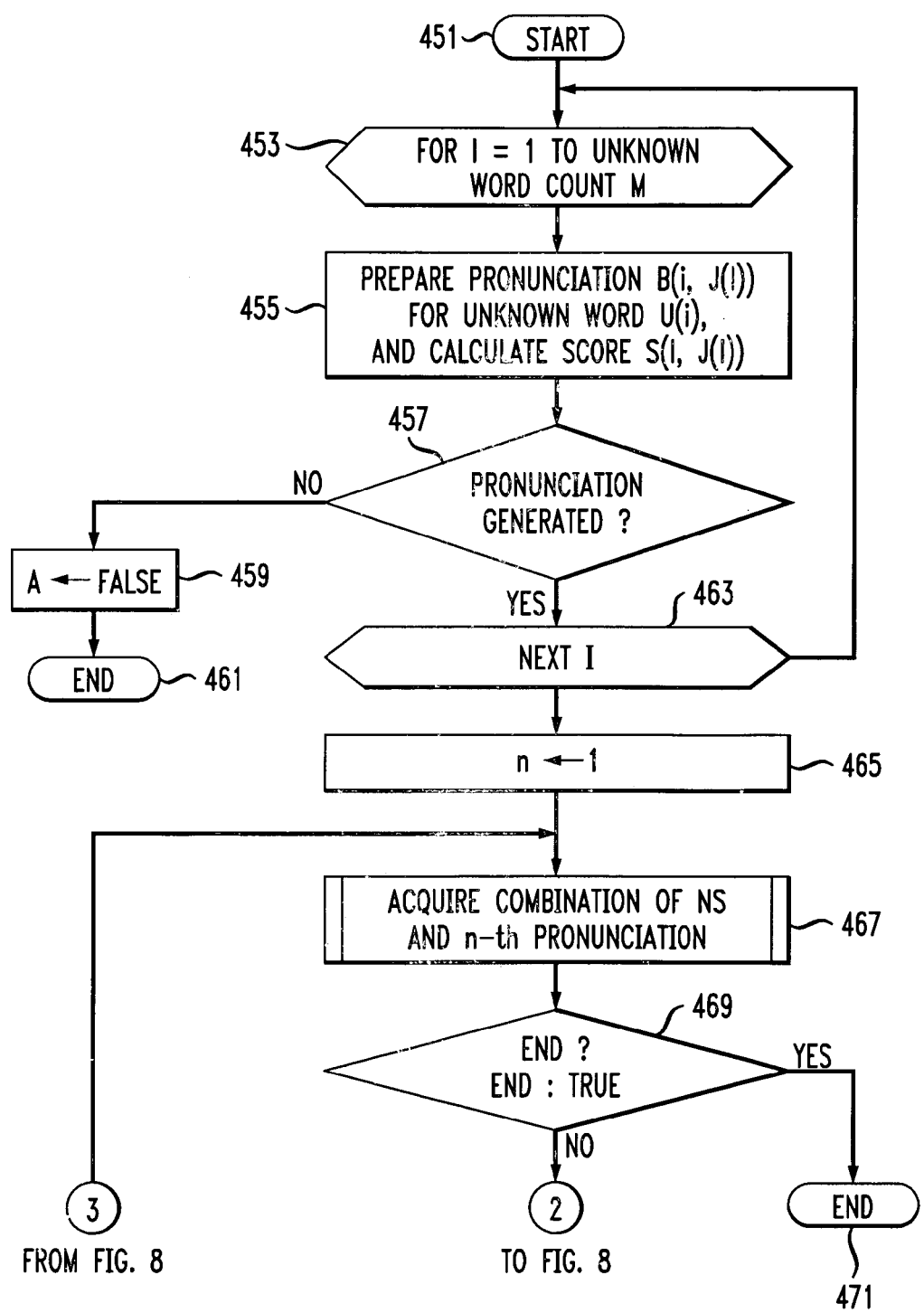
FIG. 7 is a detailed flowchart showing the unknown word registration sub-routine processing performed according to an embodiment of the present invention.
Figure 8:
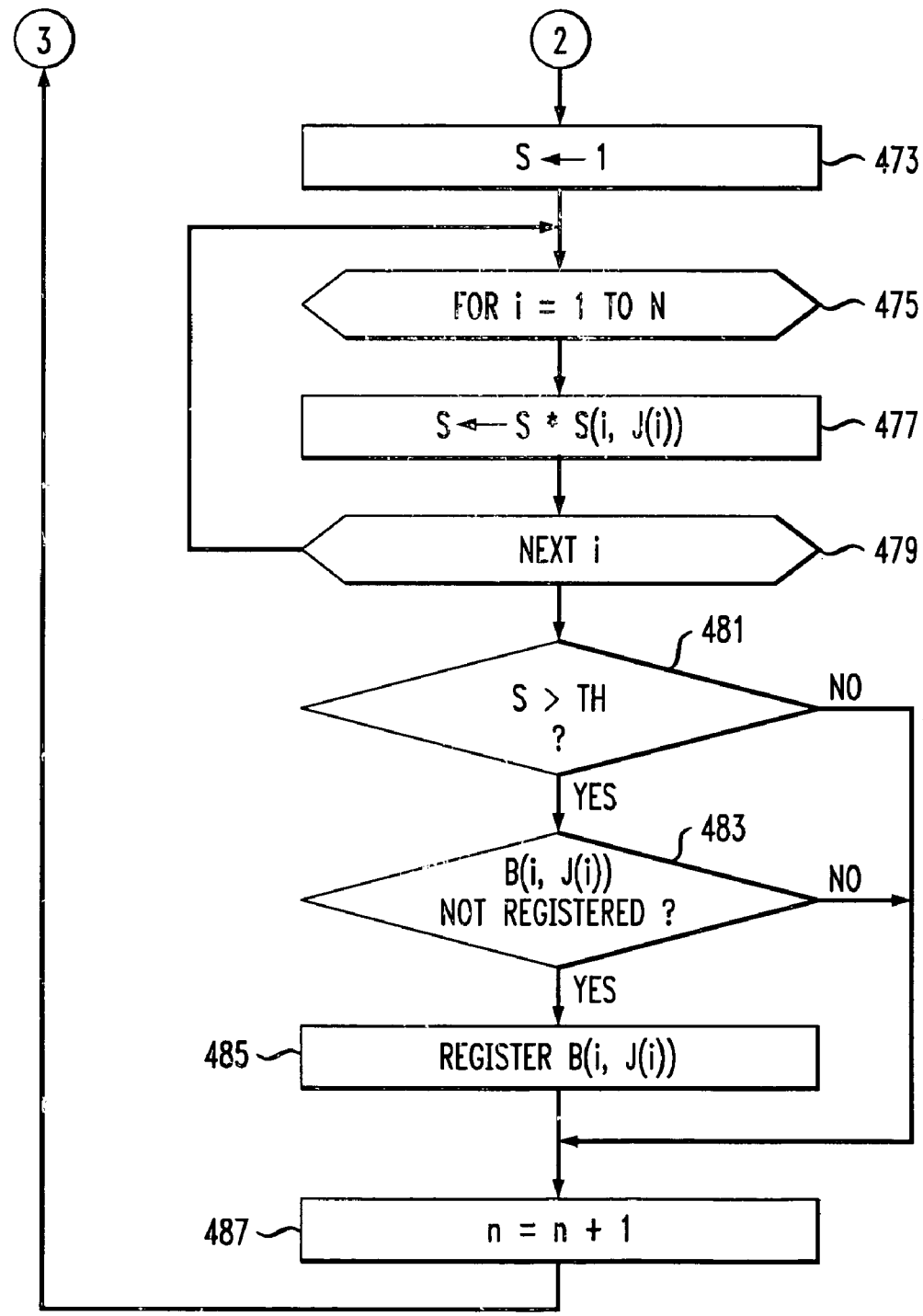
FIG. 8 is a detailed flowchart showing the unknown word registration sub-routine processing performed according to an embodiment of the present invention.

FIGS. 7 and 8 are detailed flowcharts showing the unknown word registration sub-routine at step 425. According to the outline for this processing, pronunciations for a group of unknown words are predicted, and then the pronunciations are generated and their scores calculated. The scores represent the accuracy of the pronunciations. A score for an entire target sentence is calculated using the scores for the generated pronunciation choices. When the obtained score exceeds a threshold value, the generated pronunciation for an unknown word is dynamically registered as a recognized word. But when the score for a sentence that is to be navigated does not exceed the threshold value, the pertinent pronunciation is not registered. This is done because the registration of a less accurate pronunciation will result in the deterioration of the recognition accuracy for the entire recognition system.

This process will now be described while referring to the flowcharts in FIGS. 7 and 8. First, the number of unknown words is established (step 453), and then the base form generator 207 searches the pronunciation dictionary 235 for the sounds-like spelling of each unknown word and generates a base form group corresponding to the unknown words. A pronunciation score is then calculated that corresponds to each base form. But when there is no corresponding base form in the pronunciation dictionary (step 457), an error process (step 459) is performed.

Figure 11:
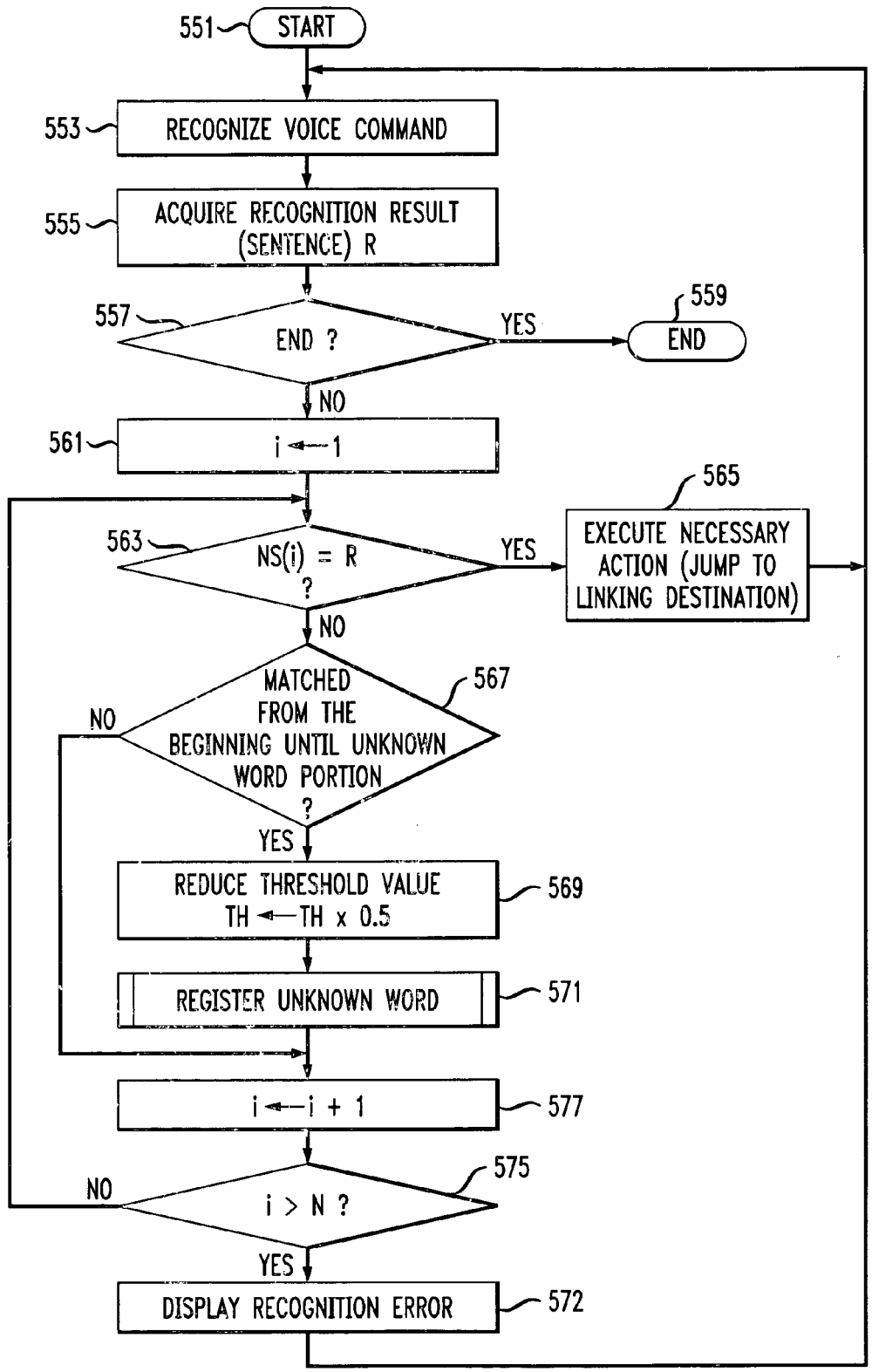
FIG. 11 is a flowchart showing the speech recognition processing performed for an embodiment of the present invention.

A combination of pronunciations is obtained for each target sentence (steps 465 and 467). FIGS. 9 and 10 are flowcharts for obtaining a combination consisting of a target sentence NS and the n-th corresponding pronunciation. In Example 1 of FIG. 12, the number of unknown words is two, there is a sounds-like spelling combination and there is pronunciation combination consisting of "Totsuka" 605 and "Shonandai," 607 and the number of combinations is "the number of unknown words"×"the number of sounds-like spellings"×"the number of pronunciations." In FIGS. 10 and 11, these combinations are acquired.

Initially, a score is set for the target sentence (step 473), and then the score for each unknown word is employed to calculate the score for the entire target sentence (steps 475 to 479). The score for each of the unknown words is calculated based on the sounds-like spelling score and the pronunciation score. When the score for the target sentence exceeds a threshold value (step 481) and an unknown word has not yet been registered (step 483), the base form for the unknown word, in the combination for which the score exceeds the threshold value, is registered in the speech recognition dictionary (registered in accordance with a combination of a word inscription and a base form) (step 485). In this embodiment, an unknown word is registered temporarily, and is erased from memory when the recognized character specification unit 201 or the speech recognition engine 203 is halted.

The above individual steps will be explained using a variable in the flowchart. First, B(i, j(i)) denotes a pronunciation choice generated for unknown word U(i) ($1 \leq i \leq n$), which is a segment of a target sentence STR_NAVI. The inequality $1 \leq j(i) \leq CN(i)$ is established for j(i) and CN(i), which is the number of pronunciation choices generated for U(i). And the score for the pronunciation choice B(i, j(i)) is defined as S(i, j(i)).

Assuming that the score for a known word is 1, the score (STR_NAVI) for sentence STR_NAVI, which is to be navigated, is S(STR_NAVI)=S(1, j(1))*S(2, j(2))* . . . *S(n, j(n)).

However, since CN(i) scores are present for every U(i), the number SCN of S(STR_NAVI) can be calculated, where SCN=CN(1)*CN(2)* . . . * CN(n).

When a threshold value used to determine whether the pronunciation should be dynamically registered is defined as TH1, from among SCN sets of S(STR_NAVI), a group of pronunciations (B(1, j(1)), B(2, j(2)), . . . , B(n, j(n))) that satisfies S(STR_NAVI)≧TH1 is dynamically registered in the recognition dictionary. Since all the words now become known words, the sentence S(STR_NAVI) can be recognized.

A case wherein Example 1 is employed is shown below. The pronunciation (Baseform) is not the same as the sounds-like spelling; however, for convenience sake, it is represented as "sounds-like spelling."

"Yokohama/shiei/chikatetsu/ga/Totsuka/kara/ Shonandai/made/encho"

---

"Totsuka"
    "totsuka"          score: 0.9 S(1, 1)
    "tozuka"           score: 0.5 S(1, 2)
"Shonandai"
    "shounandai"       score: 0.9 S(2, 1)
  TH1: 0.5
  S(1, 1)*S(2, 1) = 0.9*0.9 = 0.81 ≧ 0.5
    Registered ("Totsuka (totsuka)" "Shonandai (shounandai)")
  S(1, 2)*(2, 1) = 0.5*0.9 = 0.45 < 0.5
    Not registered In the case for Example 4,

| "Tahara" | | |
|---|---|---|
| "tahara" | score: 0.83 | S(1, 1) |
| "tawara" | score: 0.56 | S(1, 2) |
| "tabara" | score: 0.45 | S(1, 3) |
| "tabaru" | score: 0.20 | S(1, 4) |
| "dahara" | score: 0.02 | S(1, 5) |
| TH1: 0.5 | | |
| S(1, 1) = 0.83 ≥ 0.5 | registered ("Tahara (tahara)") | |
| S(1, 2) = 0.56 ≥ 0.5 | registered ("Tahara (tawara)") | |
| S(1, 3) = 0.45 < 0.5 | not registered | |
| S(1, 4) = 0.20 < 0.5 | not registered | |
| S(1, 5) = 0.02 < 0.5 | not registered | |

The detailed logic is shown below.

```
RegistBaseform(TH)
begin
Extract unknown word U(i) from STR_NAVI
for i=1 to N
Generate pronunciation choice B(i, j(i)) from U(i) using
   baseform generation algorithm
(1≦j(i)≦CN(i))
endfor
for i=1 to N
for k=0 to CN(i)
j(k)=1
endfor
endfor
loop=TRUE
while loop=TRUE
S=1
for i=0 to N
S=S*S(i, j(i))
endfor
if S≧TH
for i=0 to N
if B(i, j(i)) is not registered as pronunciation
Register B(i, j(i))
endif
endfor
endif
if next_path(1)=TRUE
loop=FALSE
endif
endwhile
end
next_path(i)
begin
if i>N
return TRUE
endif
if next_pat(i+1)=TRUE
j(i)=j(i)+1
endif
if j(i)>CN(i)
j(i)=1
return TRUE
endif
return FALSE
end
```

In the case for Example 5,

| "401(k)" | |
|---|---|
| "four-o-one-kei" | score: 0.9 |
| "four-zero-one-kei" | score: 0.9 |
| "four-hundred-one-kei" | score: 0.5 |

C-4. Dynamic Change of Threshold Value at the Time of Erroneous Recognition

The processing in this sub-division for dynamically changing a threshold value at the time of erroneous recognition is the additional processing for the present invention, and is not a requisite component for one aspect of the present invention. This processing will now be described while referring to the flowchart in FIG. 11.

First, voice information (a voice command) entered by a user's voice is fetched, and the speech recognition engine 203 obtains a sentence for speech recognition (steps 553 and 555). In this example, for the convenience sake, only one sentence is output by the speech recognition engine 203. However, the speech recognition engine may return a speech recognition group consisting of a plurality of sentences having speech recognition scores. In this case, the above process is repeated by the times equivalent to the number of sentences, and at step 563 the matching score is calculated.

To repeat the process for the target sentences, variable i is initially set (step 561). A check is performed to determine whether a speech recognition sentence to be compared matches the i-th sentence to be recognized (step 563).

When the speech recognition sentence to be compared matches the i-th sentence, the i-th sentence is recognized as the one that corresponds to the speech recognition sentence, and is employed for a necessary process (step 565). For example, if the sentence to be recognized is one obtained from a web browser, the corresponding URL (Uniform Resource Locator) is transmitted to the web browser as a URL to be displayed. Or for a word processor, the pertinent sentence can be inverted and a command corresponding to the sentence can be executed.

When the speech recognition sentence to be compared and the i-th sentence do not match, a check is performed to determine whether in the i-th sentence there is a matching portion between the beginning portion and the unknown word portion (step 567). When no matching portion exists, it is ascertained that the target i-th sentence does not correspond to the speech recognition sentence, and the next target sentence is examined (step 573). When there are no more sentences to be recognized, a recognition error message is displayed (step 572), and a user is instructed to enter the voice command again.

When a match is found for a portion extending from the sentence beginning to the unknown word portion, the threshold value, used for comparison when the base form of an unknown word is registered, is reduced (step 569), and an unknown word included in the target sentence is registered (step 571). The unknown word that is registered is used for the next speech recognition process. Therefore, if a recognition error occurs due to the pronunciation of an unknown word, the threshold value in the above processing is dynamically changed, so that frequent recognition error occurrences can be prevented.

Since TH1 is 0.5, for example, for the sentence 630 of FIG. 12, the pronunciations that are dynamically registered are "tahara" and "tawara." So if a speaker pronounces the word 635 as "tabara," the recognition engine can not recognize the full sentence, and does not return a path of 635 and 636. In this case, the threshold value for the portion of the path, leading from the beginning, that is matched is reviewed (reduced), and the pronunciation is dynamically added to designate the sentence a recognition target.

An explanation will now be given using Example 4. In this processing, if only the portion 631–634 are recognized using TH1: 0.5, the pertinent sentence is registered again using TH2: 0.25.

Sentence 630.

| The word 635 | |
|---|---|
| "tahara" | score: 0.83 S(1, 1) |
| "tawara" | score: 0.56 S(1, 2) |
| "tabara" | score: 0.45 S(1, 3) |
| "tabaru" | score: 0.20 S(1, 4) |
| "dahara" | score: 0.02 S(1, 5) |
| TH2: 0.25 | |
| S(1, 1) = 0.83 ≧ 0.25 | alread registered |
| S(1, 2) = 0.56 ≧ 0.25 | already registered |
| S(1, 3) = 0.45 ≧ 0.25 | registered (The word 635 as tabara) |
| S(1, 4) = 0.20 < 0.25 | not registered |
| S(1, 5) = 0.02 < 0.25 | not registered |

The logic employed for the processing for dynamically changing a threshold value when a recognition error occurs is shown below.
for i=1 to N
Compare NAVI_STR(i) with recognition results that are rejected if a match is found for a portion extending from the sentence beginning to an unknown word portion
TH=TH2/*threshold value smaller than preceding value*/
RegistBaseform (TH)/*register pronunciation again*/
endif
endfor As is described above, according to the present invention, even a sentence that includes words that are not registered in a speech recognition dictionary can be specified by using voice.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A voice information registration method, employed by a speech recognition apparatus, comprising:
  (a) obtaining a sentence group, which includes a first to an N-th sentence, wherein N is a number equal to or greater than two;
  (b) obtaining a sounds-like spelling for a word that is included in an i-th sentence, but is not entered in a speech recognition dictionary, wherein i is a number equal to or less than N;
  (c) obtaining a base form based on said sounds-like spelling of said word; and
  (d) registering said base form in a speech recognition dictionary in correlation with said word.

2. A sentence specification method, employed by a speech recognition apparatus, comprising:
  a registration step including:
  (a1) obtaining a sentence group, which includes a first to an N-th sentence, wherein N is a number equal to or greater than two,
  (a2) obtaining a sounds-like spelling for a word that is included in an i-th sentence, but is not entered in a speech recognition dictionary, wherein i is a number equal to or less than N,
  (a3) obtaining a base form based on said sounds-like spelling of said word, and
  (a4) registering said base form in a speech recognition dictionary in correlation with said word; and
  a recognition step including:
  (b1) obtaining voice information that is input as a user reads and vocally reproduces a display corresponding to said i-th sentence,
  (b2) employing said base form to recognize said voice information and to select a speech recognition sentence, and
  (b3) comparing said i-th sentence with said selected speech recognition sentence.

3. The sentence specification method according to claim 2, wherein said group of sentences is obtained from an application, said method further comprising a step of generating a control message corresponding to said i-th sentence and transmitting said control message to said application.

4. The sentence specification method according to claim 2, wherein a sounds-like spelling score is stored in correlation with the sounds-like spelling of said word, wherein a pronunciation score is stored in correlation with said base form, and wherein, when a function value that is obtained by using said sounds-like spelling score and said pronunciation score exceeds a threshold value, said base form is registered in a speech recognition dictionary.

5. A sentence specification method, employed by a speech recognition apparatus, comprising:
  a registration step including:
  (a1) obtaining a sentence group, which includes a first to an N-th sentence, wherein N is a number equal to or greater than two,
  (a2) obtaining a sounds-like spelling for a word that is included in an i-th sentence, but is not entered in a speech recognition dictionary, wherein i is a number equal to or less than N,
  (a3) obtaining a base form based on said sounds-like spelling of said word,
  (a4) calculating a score for said base form, and
  (a5) registering said base form, when said score for said base form exceeds a threshold value, in said speech recognition dictionary in correlation with said word; and
  a recognition step including:
  (b1) obtaining voice information that is input as a user reads and vocally reproduces a display corresponding to said i-th sentence,
  (b2) employing said base form to recognize said voice information and to select a speech recognition sentence,
  (b3) comparing said i-th sentence with said selected speech recognition sentence,
  (b4) performing a process associated with a sentence for which a match is obtained when it is found that said i-th sentence and said selected speech recognition sentence match,
  (b5) updating said threshold value to provide a smaller second threshold value when only part of said selected speech recognition sentence is matched by said i-th sentence,
  (b6) detecting an unknown word that is included in said i-th sentence, (b7) obtaining a sounds-like spelling of said unknown word, (b8) obtaining a second base form based on said sounds-like spelling for said unknown word, (b9) calculating the score for said second base form, and (b10) registering said score in said speech recognition dictionary, in correlation with said unknown word, when said score for said second base form exceeds said second threshold value.

6. A speech recognition apparatus, comprising:

(a) a sentence specification unit for obtaining a sentence group, which includes a first to an N-th sentence, wherein N is a number equal to or greater than two;

(b) an unknown word detector for obtaining a sounds-like spelling for a word that is included in an i-th sentence, but is not entered in a speech recognition dictionary, wherein i is a number equal to or less than N;

(c) a base form generator for obtaining a base form based on said sounds-like spelling of said word; and (d) a speech recognition dictionary to which said base form is stored in correlation with said word.

7. A speech recognition apparatus, comprising:

(a) a sentence specification unit for obtaining a sentence group, which includes a first to an N-th sentence, wherein N is a number equal to or greater than two;

(b) an unknown word detector for obtaining a sounds-like spelling for a word that is included in an i-th sentence, but is not entered in a speech recognition dictionary, wherein i is a number equal to or less than N;

(c) a base form generator for obtaining a base form based on said sounds-like spelling of said word;

(d) a speech recognition dictionary in which said base form is stored in correlation with said word;

(e) a voice input unit for obtaining voice information that is input as a user reads and vocally reproduces a display corresponding to said i-th sentence; and (f) a speech recognition engine for employing said base form to recognize said voice information and to select a speech recognition sentence;

wherein said sentence specification unit compares said i-th sentence with said selected speech recognition sentence.

8. The speech recognition apparatus according to claim 7, wherein said sentence specification unit obtains said group of sentences from an application, generates a control message corresponding to said i-th sentence, and transmits said control message to said application.

9. The speech recognition apparatus according to claim 7, wherein a sounds-like spelling score is stored in correlation with the sounds-like spelling of said word, wherein a pronunciation score is stored in correlation with said base form, and wherein, when a function value that is obtained by using said sounds-like spelling score and said pronunciation score exceeds a threshold value, said base form is registered in a speech recognition dictionary.

10. A speech recognition apparatus, comprising:

(a) a sentence specification unit for obtaining a sentence group, which includes a first to an N-th sentence, wherein N is a number equal to or greater than two;

(b) an unknown word detector for obtaining a sounds-like spelling for a word that is included in an i-th sentence, but is not entered in a speech recognition dictionary, wherein i is a number equal to or less than N;

(c) a base form generator for obtaining a base form based on said sounds-like spelling of said word, and for calculating a score for said base form;

(d) a speech recognition dictionary in which, when said score for said base form exceeds a threshold value, said base form is registered in said speech recognition dictionary in correlation with said word;

(e) a voice input unit for obtaining voice information that is input as a user reads and vocally reproduces a display corresponding to said i-th sentence; and (f) a speech recognition engine for employing said base form to recognize said voice information and to select a speech recognition sentence;

wherein said sentence specification unit compares said i-th sentence with said selected speech recognition sentence, performs a process associated with a sentence for which a match is obtained when it is found that said i-th sentence and said selected speech recognition sentence match, updates said threshold value to provide a smaller second threshold value when only part of said selected speech recognition sentence is matched by said i-th sentence, instructs said unknown word detector to detect an unknown word that is included in said i-th sentence and to obtain a sounds-like spelling of said unknown word, instructs said base form generator to obtain a second base form based on said sounds-like spelling for said unknown word and to calculate the score for said second base form, and registers said score in said speech recognition dictionary, in correlation with said unknown word, when said score for said second base form exceeds said second threshold value.

11. A storage medium in which a program for specifying a sentence is stored to be executed by a speech recognition apparatus, said program comprising:

(a) program code for instructing said speech recognition apparatus to obtain a sentence group, which includes a first to an N-th sentence, wherein N is a number equal to or greater than two;

(b) program code for instructing said speech recognition apparatus to obtain a sounds-like spelling for a word that is included in an i-th sentence, but is not entered in a speech recognition dictionary, wherein i is a number equal to or less than N;

(c) program code for instructing said speech recognition apparatus to obtain a base form based on said sounds-like spelling of said word; and (d) program code for instructing said speech recognition apparatus to register said base form in a speech recognition dictionary in correlation with said word.

12. A storage medium in which a program for specifying a sentence is stored to be executed by a speech recognition apparatus, said program comprising:

(a) program code for instructing said speech recognition apparatus to obtain a sentence group, which includes a first to an N-th sentence, wherein N is a number equal to or greater than two;

(b) program code for instructing said speech recognition apparatus to obtain a sounds-like spelling for a word that is included in an i-th sentence, but is not entered in a speech recognition dictionary, wherein i is a number equal to or less than N;

(c) program code for instructing said speech recognition apparatus to obtain a base form based on said sounds-like spelling of said word;

(d) program code for instructing said speech recognition apparatus to register said base form in a speech recognition dictionary in correlation with said word;

(e) program code for instructing said speech recognition apparatus to obtain voice information that is input as a user reads and vocally reproduces a display corresponding to said i-th sentence;

(f) program code for instructing said speech recognition apparatus to employ said base form to recognize said voice information and to select a speech recognition sentence; and (g) program code for instructing said speech recognition apparatus to compare said i-th sentence with said selected speech recognition sentence.

13. The storage medium according to claim 12, wherein said group of sentences is obtained from an application, and wherein program code is stored to instruct said speech recognition apparatus to generate a control message corresponding to said i-th sentence and to transmit said control message to said application.

14. The storage medium according to claim 12, wherein a sounds-like spelling score is stored in correlation with the sounds-like spelling of said word, wherein a pronunciation score is stored in correlation with said base form, and wherein, when a function value that is obtained by using said sounds-like spelling score and said pronunciation score exceeds a threshold value, said base form is registered in a speech recognition dictionary.

15. A storage medium in which a program for specifying a sentence is stored to be executed by a speech recognition apparatus, said program comprising:

(a) program code for instructing said speech recognition apparatus to obtain a sentence group, which includes a first to an N-th sentence, wherein N is a number equal to or greater than two;

(b) program code for instructing said speech recognition apparatus to obtain a sounds-like spelling for a word that is included in an i-th sentence, but is not entered in a speech recognition dictionary, wherein i is a number equal to or less than N;

(c) program code for instructing said speech recognition apparatus to obtain a base form based on said sounds-like spelling of said word;

(d) program code for instructing said speech recognition apparatus to calculate a score for said base form;

(e) program code for instructing said speech recognition apparatus to register said base form, when said score for said base form exceeds a threshold value, in said speech recognition dictionary in correlation with said word;

(f) program code for instructing said speech recognition apparatus to obtain voice information that is input as a user reads and vocally reproduces a display corresponding to said i-th sentence;

(g) program code for instructing said speech recognition apparatus to employ said base form to recognize said voice information and to select a speech recognition sentence;

(h) program code for instructing said speech recognition apparatus to compare said i-th sentence with said selected speech recognition sentence;

(i) program code for instructing said speech recognition apparatus to perform a process associated with a sentence for which a match is obtained when it is found that said i-th sentence and said selected speech recognition sentence match;

(j) program code for instructing said speech recognition apparatus to update said threshold value to provide a smaller second threshold value when only part of said selected speech recognition sentence is matched by said i-th sentence;

(k) program code for instructing said speech recognition apparatus to detect an unknown word that is included in said i-th sentence;

(l) program code for instructing said speech recognition apparatus to obtain a sounds-like spelling of said unknown word;

(m) program code for instructing said speech recognition apparatus to obtain a second base form based on said sounds-like spelling for said unknown word;

(n) program code for instructing said speech recognition apparatus to calculate the score for said second base form; and (o) program code for instructing said speech recognition apparatus to register said score in said speech recognition dictionary, in correlation with said unknown word, when said score for said second base form exceeds said second threshold value.

* * * * *